(12) United States Patent
Damji et al.

(10) Patent No.: US 9,420,523 B2
(45) Date of Patent: Aug. 16, 2016

(54) REDUCING RADIO FREQUENCY BAND SCAN TIME BY A WIRELESS COMMUNICATION DEVICE

(71) Applicant: Apple Inc., Cupertino, CA (US)

(72) Inventors: Navid Damji, Cupertino, CA (US); Sree Ram Kodali, Sunnyvale, CA (US); Johnson O. Sebeni, Fremont, CA (US); Zhu Ji, San Jose, CA (US)

(73) Assignee: Apple Inc., Cupertino, CA (US)

( * ) Notice: Subject to any disclaimer, the term of this patent is extended or adjusted under 35 U.S.C. 154(b) by 119 days.

(21) Appl. No.: 14/088,271

(22) Filed: Nov. 22, 2013

(65) Prior Publication Data

US 2014/0148170 A1 May 29, 2014

Related U.S. Application Data

(60) Provisional application No. 61/729,971, filed on Nov. 26, 2012.

(51) Int. Cl.
*H04M 1/00* (2006.01)
*H04W 48/16* (2009.01)
*H04W 36/00* (2009.01)

(52) U.S. Cl.
CPC .......... *H04W 48/16* (2013.01); *H04W 36/0083* (2013.01)

(58) Field of Classification Search
CPC . H04B 17/318; H04B 17/327; H04W 72/085; H04W 48/16; H04W 36/0083; H04W 36/14
USPC ................................. 455/67.11, 434
See application file for complete search history.

(56) References Cited

U.S. PATENT DOCUMENTS

| | | | | |
|---|---|---|---|---|
| 8,447,318 | B1 * | 5/2013 | Oroskar | H04W 76/025 370/329 |
| 2004/0132410 | A1 * | 7/2004 | Hundal | H04B 17/0085 455/67.13 |
| 2013/0155883 | A1 * | 6/2013 | Bhattacharjee | H04W 48/16 370/252 |

* cited by examiner

*Primary Examiner* — Thai Vu
(74) *Attorney, Agent, or Firm* — Downey Brand LLP

(57) ABSTRACT

Methods and apparatuses to reduce a time to scan one or more frequency channel bands by a wireless communication device are disclosed. The methods include performing, at the wireless communication device, a power scan of a band of radio frequencies; determining a maximum power level for a frequency channel in the band of radio frequencies found by the power scan; comparing the maximum power level to a threshold power level; in an instance in which the maximum power level does not equal or exceed the threshold power level, attempting acquisition on a first number of frequency channels; and in an instance in which the maximum power equals or exceeds the threshold power level, attempting acquisition on a second number of frequency channels. The second number of frequency channels is greater than the first number of frequency channels.

18 Claims, 6 Drawing Sheets

REDUCING RADIO FREQUENCY BAND SCAN TIME BY A WIRELESS COMMUNICATION DEVICE

CROSS-REFERENCE TO RELATED APPLICATIONS

This application claims the benefit of U.S. Provisional Application No. 61/729,971, filed Nov. 26, 2012 and entitled "REDUCING BAND SCAN TIME BY A WIRELESS COMMUNICATION DEVICE", which is incorporated by reference herein in its entirety for all purposes.

TECHNICAL FIELD

The described embodiments relate generally to wireless communications and more particularly to reducing radio frequency band scan time by a wireless communication device.

BACKGROUND

A wireless communication device, when powered on or when returning from an out of service condition, can perform a scan of radio frequencies to determine a set of potential wireless base transceiver stations (or their equivalent) with which to attempt to associate and/or connect. The wireless communication device can operate using one or more different radio access technologies in accordance with one or more different wireless communication protocols. Each radio access technology can use a set of radio frequencies available in one or more different radio frequency bands. The wireless communication device can attempt to locate a base transceiver station that uses a particular preferred radio access technology, e.g., an evolved Node B (eNB) of a wireless network that operates in accordance with a Long Term Evolution (LTE) wireless communication protocol. As the LTE wireless communication protocols, as published by the Third Generation Partnership Project (3GPP) standardization group, provide for a substantial number of different radio frequency (RF) channel bands, each RF channel band including numerous different radio frequencies, an exhaustive search for an available radio frequency can take a significant amount of time. Thus, an intelligent search that reduces the amount of time required to scan for radio frequencies in a radio frequency band can be desired.

The wireless communication device can seek to identify a radio frequency that uses a particular radio access technology. The wireless communication device can perform a scan of radio frequencies within a channel band (a contiguous range of radio frequencies) and determine the frequencies on which a base station may be transmitting. For example, in an LTE wireless network, the wireless communication device can perform a frequency scan within a frequency channel band and determine a set of Evolved Universal Terrestrial Radio Access Absolute Radio Frequency Channel Numbers (EARFCNs) on which an evolved Node B (eNB) may be transmitting. In general, the number of EARFCNs in a given frequency channel band can be large, and typically the wireless communication device seeks to limit the number of acquisitions it performs to reduce a time required to associate with and/or connect to a cell in a wireless network.

Presently, wireless communication devices limit the number of acquisition attempts by scanning for a static number, n, of frequencies determined to have the strongest detected power during a frequency band scan. This criterion can guarantee that the frequency band scan time will not take more than $n*T$ for attempting a single acquisition, where T corresponds to a time to search a given radio frequency. However, using a static number to limit the number of frequencies on which to attempt acquisition may not be optimal in many circumstances. For example, in the case of an empty radio frequency channel band, with no frequencies available with which to connect or none that use one or more particular or preferred radio access technologies, such as a frequency band without any LTE signals, attempting acquisition using a fixed static number of frequencies can take a relatively long time, only to ultimately result in an unsuccessful acquisition attempt. On the other hand, if the radio frequency channel band is highly loaded, such as when the wireless communication device can receive signals from multiple different overlapping cells of different wireless network, then it can be desirable to spend more time to attempt acquisition on a range of frequencies, as it is likely that some of the frequencies may be transmitted in accordance with a preferred radio access technology, e.g., an LTE signal, while other frequencies may include signals from wireless networks that use less preferred or non-preferred radio access technologies. Thus, for example, if it is desired to scan for an LTE system, it can be desirable to spend more time inspecting numerous frequencies from "strong" systems in a "crowded" radio frequency channel band to prune out the non-LTE systems, e.g., by increasing the number of frequencies scanned, such that any available cells of a preferred radio access technology, e.g., LTE systems, are not overlooked.

SUMMARY OF THE DESCRIBED EMBODIMENTS

Methods and apparatuses to reduce a time to scan one or more radio frequency channel bands by a wireless communication device are disclosed herein. A method performed at the wireless communication device includes the following steps. In a first step, the wireless communication device performs a power scan of a band of radio frequencies. In some embodiments, the wireless communication device performs the power scan by measuring a power level over a plurality of candidate frequency channels. In a second step, the wireless communication device determines a maximum power level for a frequency channel in the band of radio frequencies found by the power scan. In a third step, the wireless communication device compares the maximum power level to a first threshold power level. In an instance in which the maximum power level does not equal or exceed the first threshold power level, the wireless communication device attempts acquisition on a first number of frequency channels. In an instance in which the maximum power level equals or exceeds the first threshold power level, attempting acquisition on a second number of frequency channels. In some embodiments, the second number of frequency channels is greater than the first number of frequency channels.

In another method performed at the wireless communication device, the following steps are performed. In a first step, the wireless communication device performs a power scan of a band of radio frequencies. In a second step, the wireless communication device determines a percentage of frequency channels having power levels equal or exceeding a first threshold power level. In a third step, the wireless communication device compares the determined percentage of frequency channels to a first threshold percentage level. In an instance in which the determined percentage of frequency channels equals or exceeds the first threshold percentage level, the wireless communication device attempts acquisition on a first number of frequency channels. In an instance in which the determined percentage of frequency channels does not equal or exceed the first threshold percentage level, the wireless communication device attempts acquisition on a second number of frequency channels. In some embodiments, the first number of frequency channels is greater than the second number of frequency channels. In some embodiments, the wireless communication device generates a cumulative distribution function based at least in part on the power scan, and the wireless communication device determines the percentage of frequency channels having power levels equal or exceeding the first threshold power level by using the cumulative distribution function to determine the percentage of frequency channels having power levels exceeding the first threshold power level.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION OF SELECTED EMBODIMENTS

Figure 1:
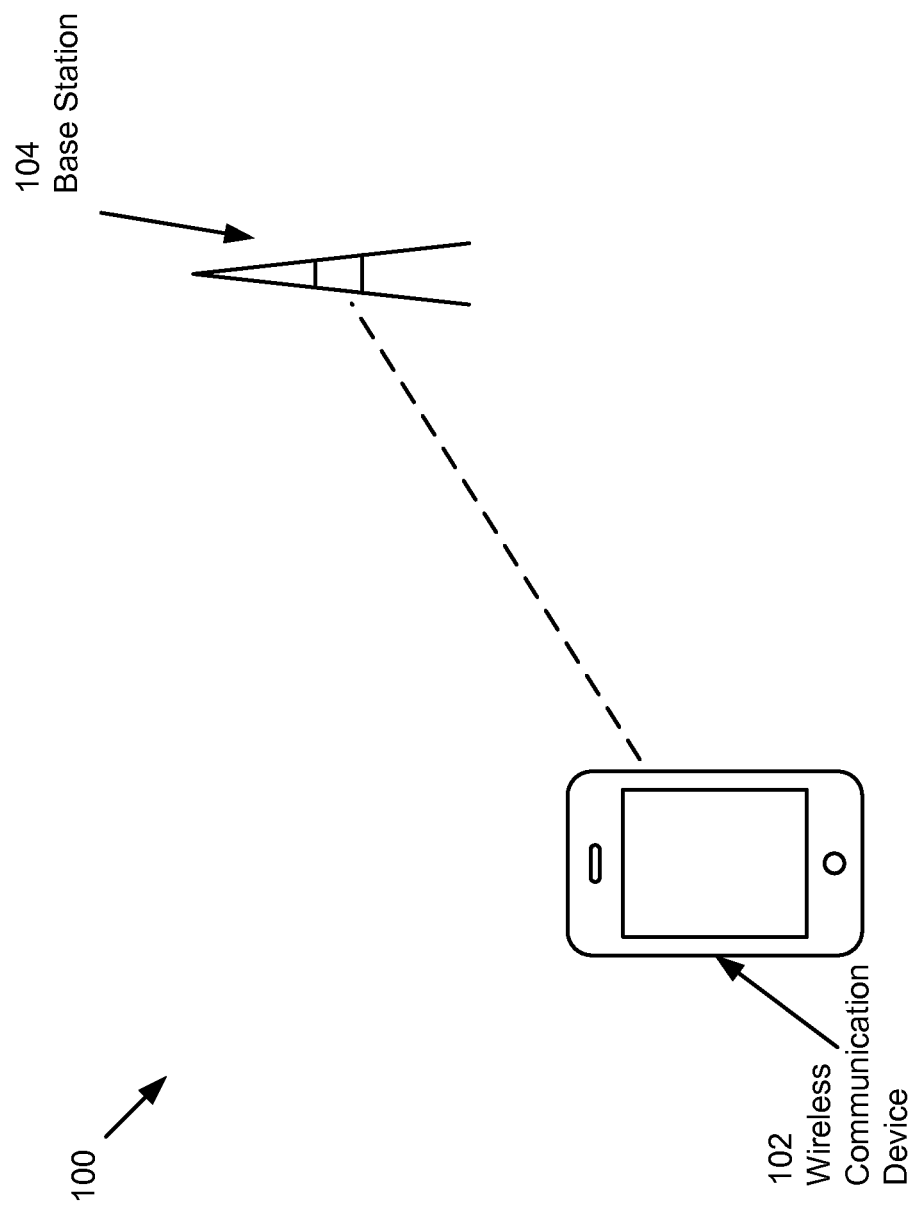
FIG. 1 illustrates a wireless communication system in accordance with some example embodiments.

Representative applications of the systems, methods, apparatuses, and computer program products disclosed herein are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Some example embodiments disclosed herein provide for reducing band scan time by a wireless communication device. In this regard, rather than always attempting acquisition on a static number of frequencies in a radio frequency channel band, some example embodiments use a power spectrum obtained by a band scan to determine a number of frequencies on which to attempt acquisition. For example, some embodiments select a number of frequencies on which to attempt acquisition based at least in part on a maximum power found during a scan of received power in a frequency channel band. As another example, some embodiments select a number of frequencies on which to attempt acquisition based at least in part on a distribution of power across a frequency channel band measured during a scan of received power in the frequency channel band. In this regard, various embodiments provide for intelligent decision-making regarding how many frequencies on which to attempt an acquisition to associate with and/or connect to a wireless network after performing a power scan of a radio frequency channel band. If a scanned radio frequency channel band is crowded with multiple powerful frequencies, some embodiments provide for attempting acquisition on a greater number of frequencies. Searching through more frequencies can increase a likelihood of locating a frequency for a preferred radio access technology. However, if a scanned radio frequency channel band appears to be empty, or has relatively few frequencies exceeding a threshold power level, then acquisition can be attempted on fewer frequencies in accordance with some embodiments. Searching through fewer frequencies can reduce the time spent searching for compatible radio access technology networks when there is a low likelihood of a successful outcome.

FIG. 1 illustrates a wireless communication system 100 in accordance with some example embodiments. The system 100 can include a wireless communication device 102. By way of non-limiting example, the wireless communication device 102 can be a cellular phone, such as a smart phone device, a tablet computing device, a laptop-computing device, or other computing device configured to wirelessly access a network. In some example embodiments, such as embodiments in which the wireless communication device 102 supports communication with an LTE wireless network, the wireless communication device 102 can be referred to as user equipment (UE). Many wireless communication devices 102 can communicate using a variety of wireless communication protocols that are based on particular radio access technologies (RATs). In some embodiments, the wireless communication device 102 includes a list and/or a decision-making algorithm by which to select among different available wireless networks according to different RATs and/or different wireless communication protocols used by the available wireless networks. The wireless communication device 103 can have a set of preferred RATs, which in some embodiments can be ordered according to a preferred priority for use by the wireless communication device 102.

The wireless communication device 102 of various example embodiments can be configured to connect to a network via one or more RATs that can be implemented by a base station 104 within the system 100. For example, in some example embodiments, a base station 104 can provide access to a network using a fourth generation (4G) cellular communications radio access technology (RAT), such as a RAT implementing an LTE technology, such as LTE, LTE-Advanced (LTE-A), or other present or future developed LTE standard. However, it will be appreciated that some embodiments can be applied in existing and/or future-developed networks that can use a non-LTE, or a non-4G RAT. For example, a base station 104 can provide network access can be configured to provide access to a network via a third generation (3G) RAT, such as a Wideband Code Division Multiple Access (WCDMA) or other Universal Mobile Telecommunications System (UMTS) network, such as a Time Division Synchronous Code Division Multiple Access (TD-SCDMA) network. As a further example, a base station 104 can be configured to provide access to a network via a CDMA2000 RAT, such as a 1×RTT RAT, or other RAT standardized by the Third Generation Partnership Project 2 (3GPP2). As another example, a base station 104 can be configured to provide access to a network via a second generation (2G) RAT, such as a Global System for Mobile Communications (GSM) network.

The wireless communication device 102 can be configured to wirelessly access a network via a base station, such as the base station 104. The base station 104 can be any type of cellular base station. By way of non-limiting example, the base station 104 can be an evolved node B (eNB), e.g., as used in an LTE wireless network, a node B, e.g., as used in a UMTS wireless network, a base transceiver station (BTS), e.g., as used in a Code Division Multiple Access (CDMA) wireless network, and/or any other appropriate type of base station depending on the RAT implemented on the wireless network in which the base station operates. While only a single base station 104 is illustrated in FIG. 1, the wireless communication device 102 can be within signaling range of multiple base stations 104, and each base station can support multiple cells, each of which can use a different radio frequency channel. As such, the wireless communication device 102 can receive radio frequencies from multiple cells and/or multiple base stations on a number of different radio frequency channels. Base stations within signaling range of the wireless communication device 102 can use any of a variety of radio access technologies (RATs). The wireless communication device 102 can search for frequencies on which cells in a geographic vicinity of the wireless communication device 102 operate and determine whether to attempt acquisition on frequencies identified in a radio frequency channel band searched by the wireless communication device 102. In some embodiments, the wireless communication device 102 uses power spectrum measurements to assess a radio frequency channel band and determine a number of radio frequencies on which to attempt acquisition.

The wireless communication device 102 searches for a suitable cell of a wireless network by identifying one or more frequencies in a radio frequency channel band on which communication with a wireless network may be possible. The wireless communication device 102 can carry out a cell search procedure upon power up, when returning from an out of service condition, and while in a connected or idle state (e.g., to provide for cell reselection or handover). The wireless communication device 102 can be configured to perform a scan of radio frequencies in one or more radio frequency channel bands to identify one or more radio frequencies on which a base station 104 (or a cell of the base station 104) within signaling range of the wireless communication device 102 can be transmitting. In order to associate with or connect to a cell, the wireless communication device 102 can attempt to acquire synchronization and decode information transmitted by a cell on frequencies located during the radio frequency band scan. The wireless communication device 102 can also evaluate any located cells to determine their "suitability" for connection with the wireless communication device 102, e.g., some cells may use a preferred RAT. An exhaustive search of all frequencies in one or more radio frequency channel bands, however, can require an extensive amount of time, and thus it is desirable to locate "strong" frequencies with a higher likelihood of success in a shorter period of time than can be achieved with an exhaustive search or with a search that uses a fixed number of frequencies. It can also be desired to locate frequencies for cells that operate in accordance with a preferred RAT.

Figure 2:
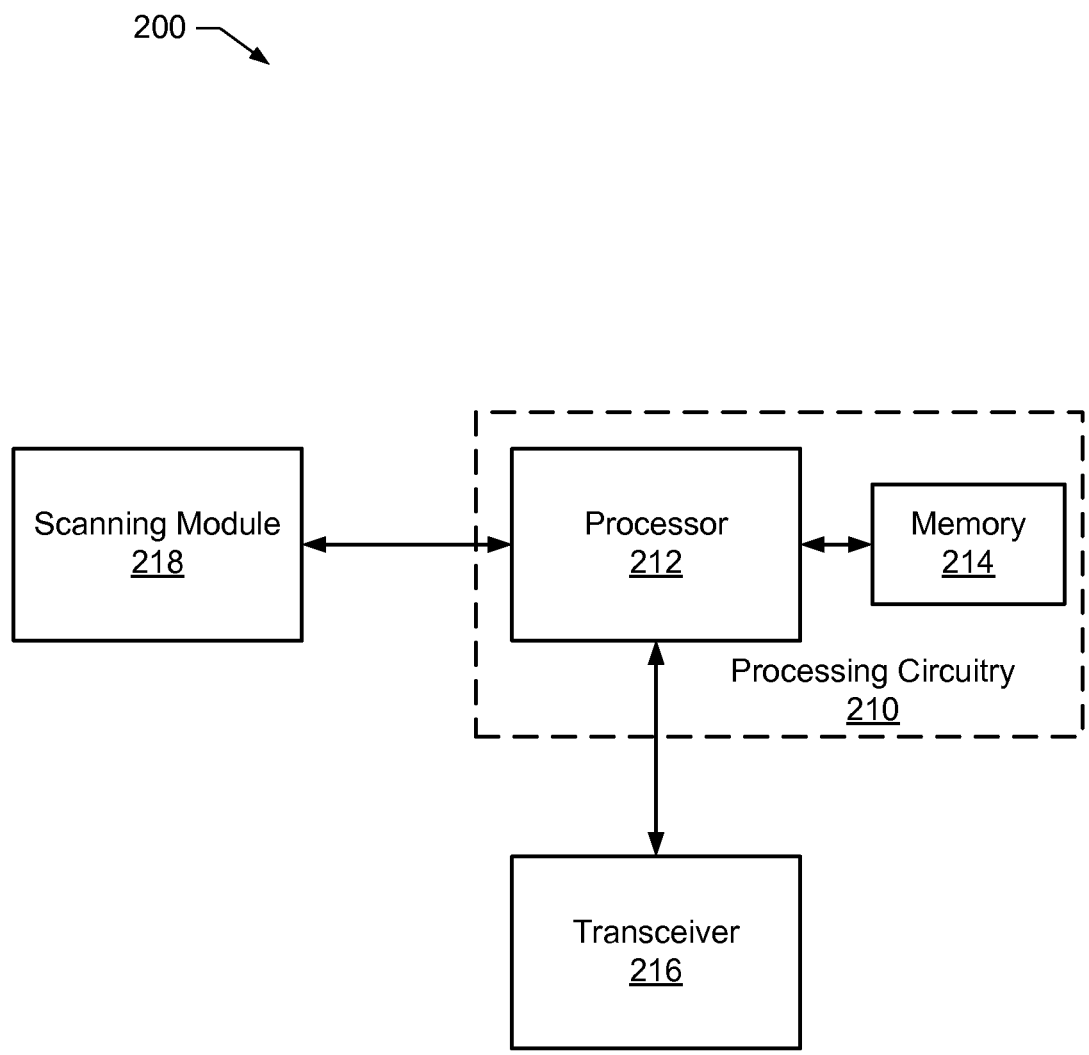
FIG. 2 illustrates a block diagram of an apparatus that can be implemented on a wireless communication device in accordance with some example embodiments.

FIG. 2 illustrates a block diagram of an apparatus 200 that can be implemented on a wireless communication device 102 in accordance with some embodiments. In this regard, when implemented on a computing device, such as wireless communication device 102, apparatus 200 can enable the computing device to operate within the system 100 in accordance with one or more embodiments. It will be appreciated that the components, devices or elements illustrated in and described with respect to FIG. 2 below may not be mandatory and thus some may be omitted in certain embodiments. Additionally, some embodiments can include further or different components, devices or elements beyond those illustrated in and described with respect to FIG. 2.

In some example embodiments, the apparatus 200 can include processing circuitry 210 that is configurable to perform actions in accordance with one or more embodiments disclosed herein. In this regard, the processing circuitry 210 can be configured to perform and/or control performance of one or more functionalities of the apparatus 200 in accordance with various example embodiments, and thus can provide means for performing functionalities of the apparatus 200 in accordance with various example embodiments. The processing circuitry 210 can be configured to perform data processing, application execution and/or other processing and management services according to one or more example embodiments.

In some embodiments, the apparatus 200 or a portion(s) or component(s) thereof, such as the processing circuitry 210, can include one or more chipsets, which can each include one or more chips. The processing circuitry 210 and/or one or more further components of the apparatus 200 can therefore, in some instances, be configured to implement an embodiment on a chipset. In some example embodiments in which one or more components of the apparatus 200 are embodied as a chipset, the chipset can be capable of enabling a computing device to operate in the system 100 when implemented on or otherwise operably coupled to the computing device.

In some example embodiments, the processing circuitry 210 can include a processor 212 and, in some embodiments, such as that illustrated in FIG. 2, can further include memory 214. The processing circuitry 210 can be in communication with or otherwise control a transceiver 216 and/or a scanning module 218.

The processor 212 can be embodied in a variety of forms. For example, the processor 212 can be embodied as various processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 212 can comprise a plurality of processors. The plurality of processors can be in operative communication with each other and can be collectively configured to perform one or more functionalities of the apparatus 200 as described herein. In some example embodiments, the processor 212 can be configured to execute instructions that can be stored in the memory 214 or that can be otherwise accessible to the processor 212. As such, whether configured by hardware or by a combination of hardware and software, the processor 212 capable of performing operations according to various embodiments while configured accordingly.

In some example embodiments, the memory 214 can include one or more memory devices. Memory 214 can include fixed and/or removable memory devices. In some embodiments, the memory 214 can provide a non-transitory computer-readable storage medium that can store computer program instructions that can be executed by the processor 212. In this regard, the memory 214 can be configured to store information, data, applications, instructions or an equivalent for enabling the apparatus 200 to carry out various functions in accordance with one or more example embodiments. In some embodiments, the memory 214 can be in communication with one or more of the processor 212, transceiver 216, or scanning module 218 via a bus(es) for passing information among components of the apparatus 200.

The apparatus 200 can further include transceiver 216. The transceiver 216 can enable the apparatus 200 to send wireless signals to and receive signals from one or more wireless networks. As such, the transceiver 216 can be configured to support communication between the wireless communication device 102 and a base station 104 in accordance with a RAT that can be used by the base station 104.

The apparatus 200 can further include scanning module 218. The scanning module 218 can be embodied as various means, such as circuitry, hardware, a computer program product comprising computer readable program instructions stored on a non-transitory computer readable medium (for example, the memory 214) and executed by a processing device (for example, the processor 212), or some combination thereof. In some embodiments, the processor 212 (or the processing circuitry 210) can include, or otherwise control the scanning module 218.

In some embodiments, a scan time for the wireless communication device 102 to scan a radio frequency channel band to locate a set of candidate frequencies on which to continue processing to search for a suitable cell with which to associate or connection can be reduced based at least in part on a maximum power level found in a power scan of a radio frequency channel band. In this regard, a number of frequencies on which the wireless communication device 102 can attempt acquisition can be selected based at least in part on a maximum power level found by a band scan in accordance with some embodiments. The wireless communication device 102 can measure a power spectrum (which can also be referred to as a "power scan") across a range of frequencies in a radio frequency channel band to identify candidate frequencies. In some embodiments, the maximum power level corresponds to a maximum power spectral density value measured in the scanned radio frequency channel band. As defined by the 3GPP, LTE networks can use multiple radio frequency channel bands in different geographic regions, and each radio frequency channel band can include numerous different channel frequencies on which to operate. In addition, each radio access technology can operate in its own radio frequency channel band with its own set of frequency channels, which can add to the complexity of searching for a suitable cell. In some embodiments, the wireless communication device 102 can attempt to search for a suitable cell among hundreds of channel frequencies to choose. In some embodiments, the wireless communication device 102 can measure received power across a radio frequency channel band and can attribute a higher measured received power level in the radio frequency channel band to indicate a higher likelihood of locating a suitable cell among radio frequency channels in the radio frequency channel band. The wireless communication device 102 can select a subset of (less than all) radio frequency channels measured that exceed a power threshold level and can continue a search procedure using the smaller subset of radio frequency channels. In some embodiments, the wireless communication device 102 measures a power level across a range of radio frequencies that can include reference signals broadcast by different cells that use different radio access technologies. A measured power level may provide no indication of a particular radio access technology in use, and thus the wireless communication device 102 can perform additional "search" procedures on frequency channels that measure to equal or exceed a particular power level. A search procedure performed at a particular frequency, e.g., to identify a radio access technology, to synchronize with a broadcast synchronization signal, or other procedures to locate a suitable cell can take a longer time than a relatively simple power level measurement. Thus a relatively quick power scan can provide information by which to inform a subsequent search on which to perform additional searches, e.g., for synchronization, etc., in order to locate a suitable cell. When the power scan indicates that a range of frequencies have a low likelihood of containing a suitable cell, e.g., an "empty" channel band with measured power levels at or near a noise floor of the wireless communication device 102, then the wireless communication device 102 can avoid wasting time performing a more thorough search in that range of frequencies, as the likelihood of locating a suitable cell in the range of frequencies is low. A sub-optimal search that would attempt to search through a fixed number of frequency channels in an "empty" radio frequency channel band would add to a time to acquire a suitable cell for the wireless communication device 102. Adjusting a search based on power levels and/or based on an assessment of characteristics of the power levels measured in a radio frequency channel band can provide for quicker and more accurate search, as described further herein.

Figure 3:
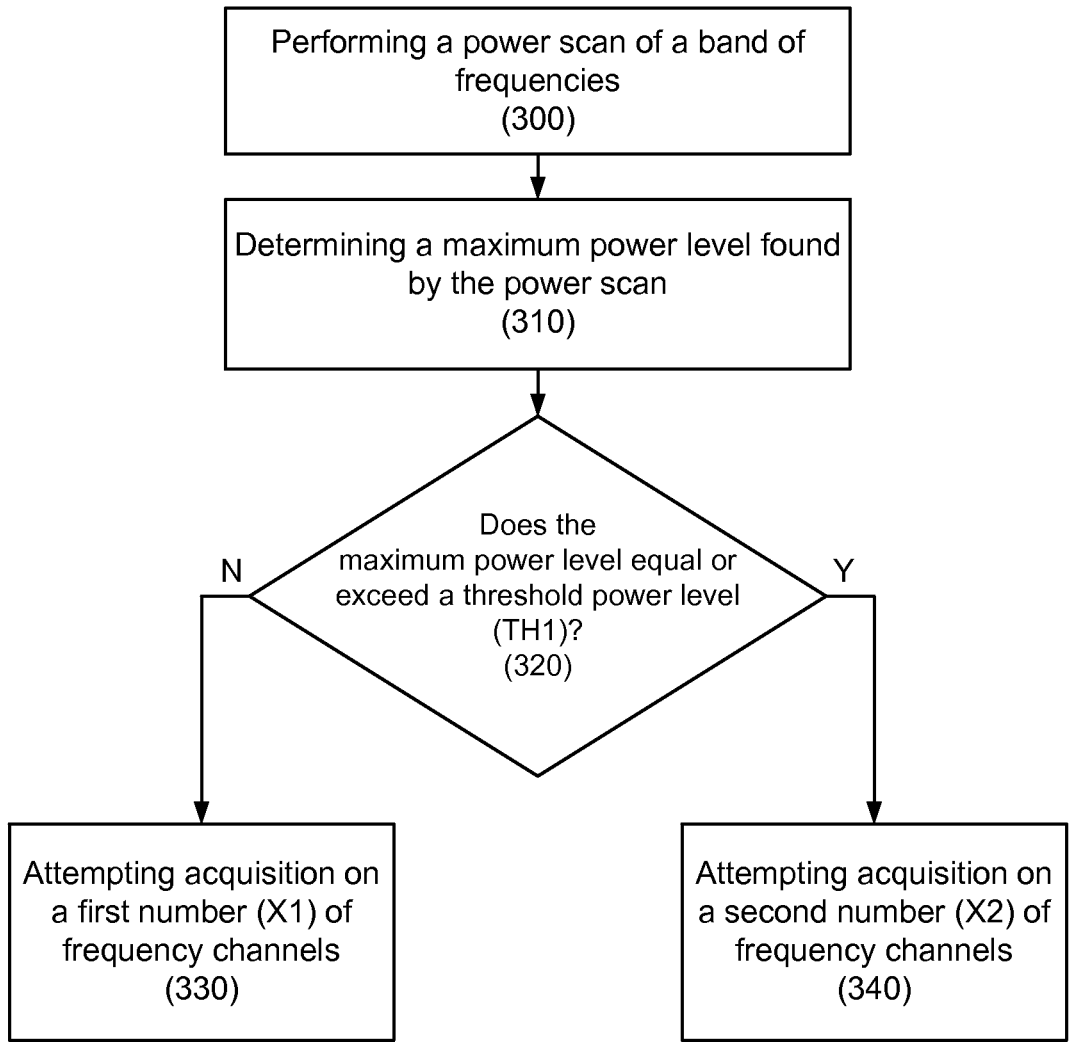
FIG. 3 illustrates a flowchart of an example method for reducing band scan time by a wireless communication device based on a maximum power found by a band scan according to some example embodiments.

FIG. 3 illustrates a flowchart of an example method according to some embodiments. Operation 300 can include the scanning module 218 performing a power scan of a channel band of radio frequencies. The power scan can provide a power spectrum for the scanned band of frequencies. The power scan can be performed for a specific RAT(s). For example, when scanning for an LTE system, the power scan can include a scan of a set of EARFCNs that can operate in a radio frequency channel band appropriated for LTE wireless networks in which each EARFCN can be spaced apart by 100 kHz. Operation 310 can include the scanning module 218 determining a maximum power level found by the power scan, e.g., a maximum power level for each radio frequency channel (or for each EARFCN) across the radio frequency channel. The measured power level can vary for each EARFCN measured, with some channels having higher power levels, while other channels having lower power levels.

In some embodiments, the measured power level is a measure of a reference signal received power (RSRP), a received signal code power (RSCP), a received signal strength indicator (RSSI), or other power metric that can be appropriate for an associated radio access technology. Operation 320 can include the scanning module 218 determining whether the maximum power found by the power scan satisfies (e.g., is greater than, or is greater than or equal to depending on embodiment) a threshold power level, TH1. In an instance in which the maximum power does not satisfy the threshold power level TH1, the method can proceed to operation 330, which can include the wireless communication device 102 attempting acquisition on a first number, X1, of frequencies. When, however, the maximum power found by the power scan does satisfy the threshold power level TH1, the method can proceed to operation 340, which can include the wireless communication device 102 attempting acquisition on a second number, X2, of frequencies. In some embodiments, the number X2 can be greater than the number X1. In this regard, when a maximum power level found by the power scan is higher than a threshold power level, which in some embodiments can be a pre-determined threshold level value, then the wireless communication device 102 can attempt an acquisition search using a larger number of frequencies than when the maximum power level does not exceed the threshold power level TH1. When the maximum power found by the power scan is lower than the threshold power level TH1, acquisition can be attempted on fewer frequencies to avoid spending an excessive amount of time attempting acquisition for a radio frequency channel that does not include a strong signal (relative to the threshold power level TH1).

In some embodiments, a method can use a layered approach having multiple threshold power levels. In this regard, a plurality of threshold power levels can be used to form different tiers of power levels, with a different number of search acquisitions (i.e., values for the numbers Xn, n=1, 2, . . . , of frequencies searched) being performed for each tier of measured power levels. Thus, for example, a "low" tier can be defined for an instance in which the maximum measured power level does not exceed a first threshold power level, TH1. A "medium" tier can be defined for an instance in which the maximum measured power level exceeds TH1, but does not exceed a second threshold power, TH2 (TH2>TH1). A "high" tier can be defined for an instance in which the measured maximum power level exceeds TH2. As such, the higher the tier that the measured maximum power level falls in, the more acquisitions can be attempted in accordance with some embodiments. It will be appreciated that in embodiments using a layered approach, any number of threshold power levels and corresponding tiers can be applied.

Figure 4:
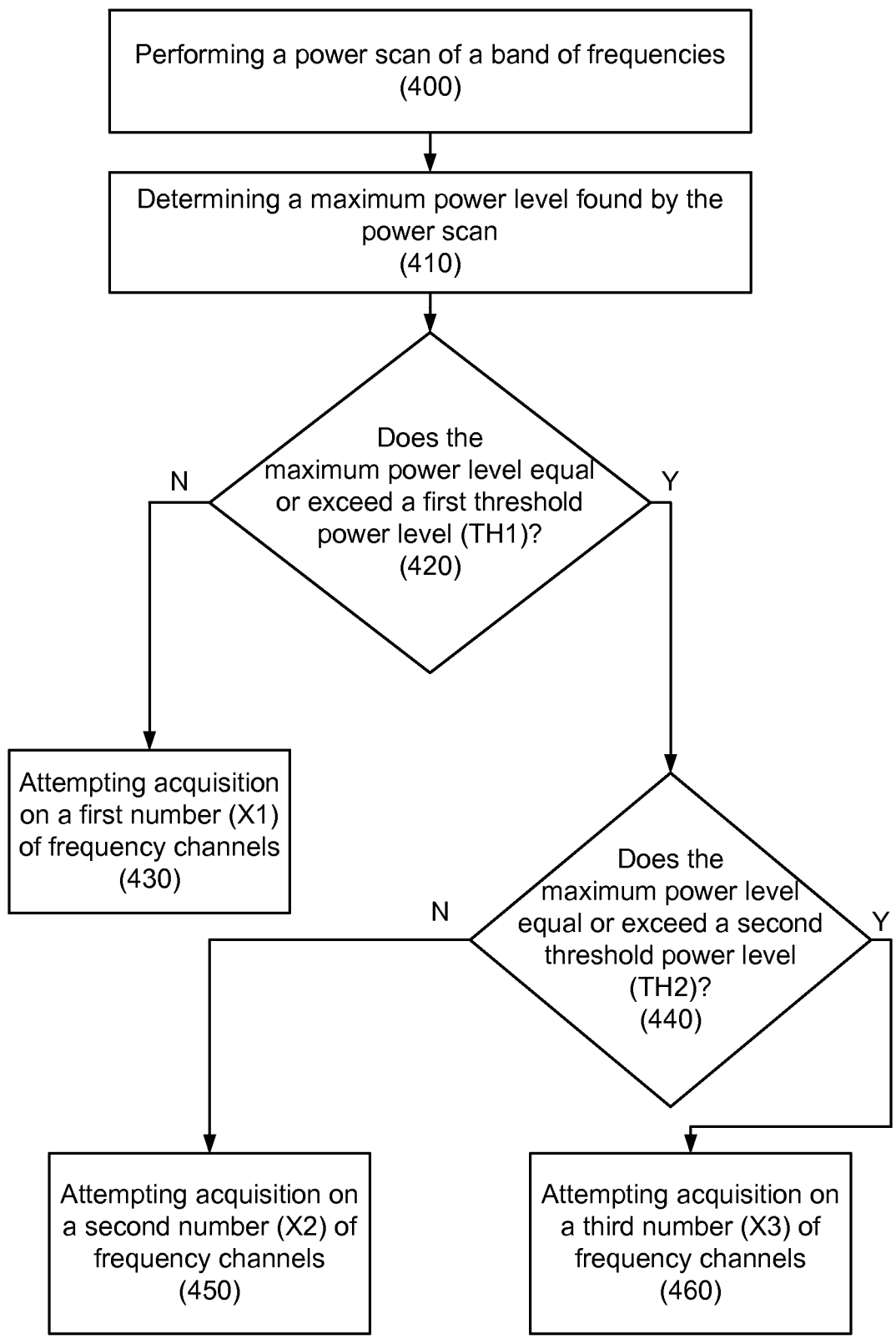
FIG. 4 illustrates a flowchart of another example method for reducing band scan time by a wireless communication device based on a maximum power found by a band scan according to some example embodiments.

FIG. 4 illustrates a representative method in accordance with an example embodiment using two power threshold levels and three resulting tiers. Operation 400 of the representative method can include the scanning module 218 performing a power measurement across a radio frequency channel band of frequencies, e.g., a power scan. The power scan can provide a power spectrum for the scanned channel band of radio frequencies. The power scan can be performed using parameters that match a specific RAT(s). For example, when scanning for an LTE system, the band power can include a scan of EARFCNs used by the LTE system. Operation 410 can include the scanning module 218 determining a maximum measured power level, across a channel bandwidth, measured by the power scan. In some embodiments, a power spectral density power measurement can be performed and power can be summed across representative channel bandwidths. Operation 420 can include the scanning module 218 determining whether the maximum measured power level found by the power scan satisfies (e.g., is greater than, or is greater than or equal to depending on embodiment) a first threshold power level, TH1. In an instance in which the maximum power does not satisfy the threshold power level TH1, the method can proceed to operation 430, which can include the wireless communication device 102 attempting acquisition on a first number, X1, of frequency channels. When, however, the measured maximum power level satisfies (e.g., is greater than, or is greater than or equal to depending on embodiment) the threshold power level TH1, the method can proceed to operation 440, which can include the scanning module 218 determining whether the measured maximum power level found by the power scan satisfies (e.g., is greater than, or is greater than or equal to depending on embodiment) a second threshold power level, TH2. In some embodiments, the second threshold power level TH2 can be greater than the first threshold power level TH1. In an instance in which the maximum power does not satisfy the threshold TH2, the method can proceed to operation 450, which can include the wireless communication device 102 attempting acquisition on a second number, X2, of frequencies. In some embodiments, the number X2 of frequencies on which to attempt acquisition can be greater than the number X1 of frequencies attempted when the maximum measured power level is lower. When, however, the measured maximum power level does satisfy the power threshold level TH2, the method can proceed to operation 460, which can include the wireless communication device 102 attempting acquisition on a third number, X3, of frequencies. In some embodiments, X3 can be greater than X2. Thus, with a higher maximum measured power level, a larger number of frequencies can be searched to attempt acquisition for a suitable cell with which to associate and/or connect.

In some embodiments, additional threshold power levels and additional resulting tiers can be used. For example, a comparison between the maximum measured power level and a third power threshold level can be performed to determine if the maximum measured power level is being greater than TH2, which can be used in place of operation 460 to continue a search for higher maximum values, and/or to divide the power levels into narrower bands of measured power levels. As such, it will be appreciated that threshold comparison operations can be iterated with different ranges of threshold powers and different numbers of frequencies on which to attempt acquisition in some embodiments. It will also be appreciated that in some embodiments a search can be performed by comparing measured power levels to determine whether a maximum measured power level exceeds a particular threshold level, e.g., −50 dBm, and when no maximum measured power level exceeds the particular threshold level, a new lower level can be tested, e.g., −60 dBm, with each successive threshold power level against which to test the maximum measured power level occurring at lower levels, e.g., incrementing by a regular amount or by looking up threshold power levels in a table stored in the wireless communication device 102. In some embodiments, the wireless communication device 102 uses a maximum measured power level to access a table to determine a range of power levels in which the maximum measured power level falls and to ascertain a corresponding value for a number of frequency channels to search for acquisition based on the range of power levels in which the maximum measured power level falls.

In some embodiments, a time for radio frequency band scanning by the wireless communication device 102 can be reduced based at least in part on a determined distribution of measured power levels for various frequency channels obtained by a power scan. In this regard, a number of radio frequency channels on which the wireless communication device 102 attempts acquisition can be selected based at least in part on a percentage of radio frequency channels found during a power scan of the radio frequency channel band that have a measured power level exceeding a threshold power level in accordance with some embodiments. In some embodiments, the wireless communication device 102 can determine a probability distribution function (PDF) and/or a cumulative distribution function (CDF) of measured power levels across a range of radio frequencies scanned by the power scan. In some embodiments, the PDF can capture a number of radio frequency channels that fall within a range of power levels, while the CDF can capture a number of radio frequency channels that fall at or below a power threshold level. For example, the PDF can represent the number of radio frequency channels within ranges of power levels that span 10 dBm, e.g., from −135 dBm to −125 dBm, from −125 dBm to −115 dBm, . . . from −55 dBm to −45 dBm. In some embodiments, the CDF can represent the number of radio frequency channels measured to have a power level at or below different threshold power levels, e.g., below −130 dBm, below −120 dBm, below −110 dBm, . . . below −50 dBm, below −40 dBm. Alternatively, the CDF can be determined based on the number of radio frequency channels measured to have power level at or above different threshold power levels.

Figure 5:
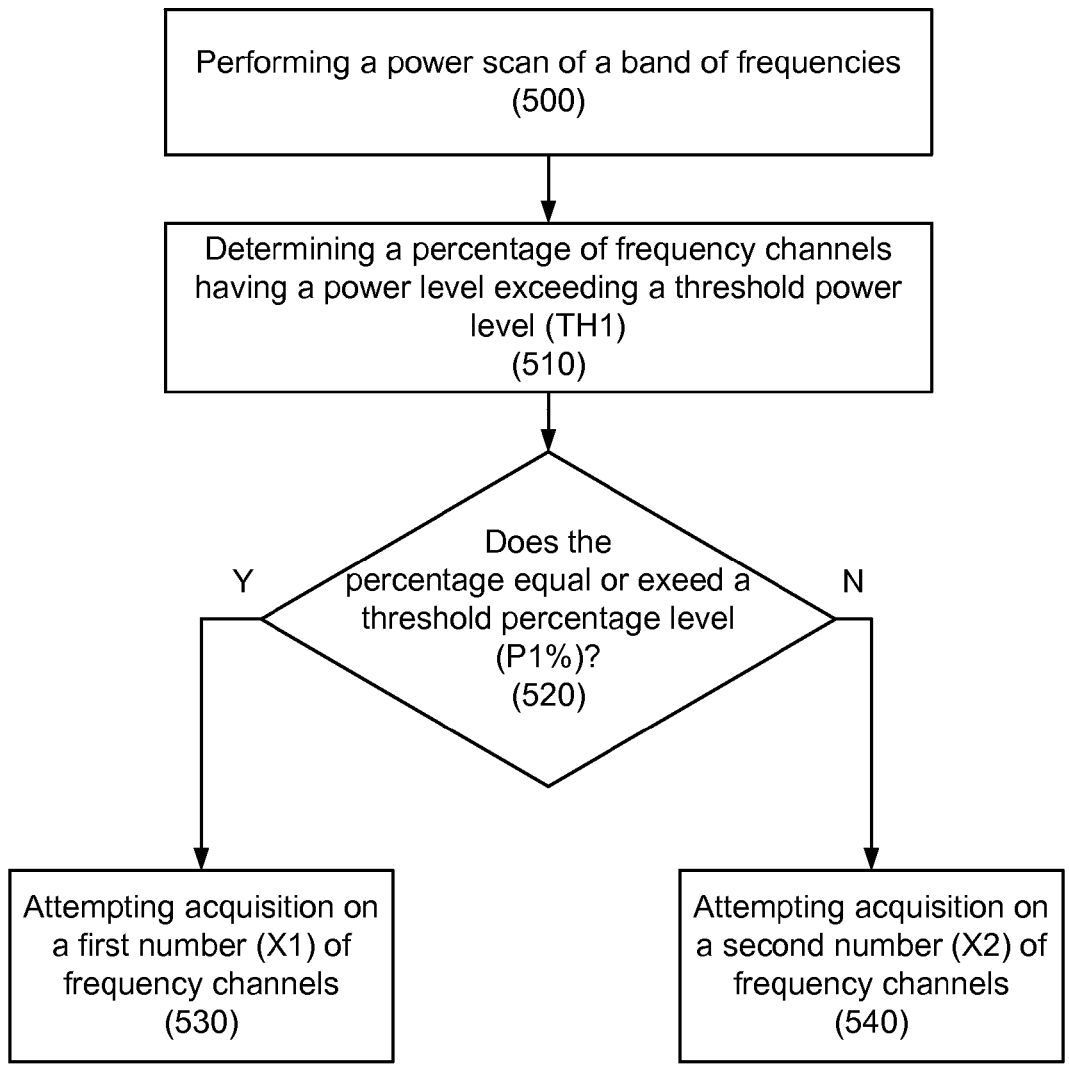
FIG. 5 illustrates a flowchart of an example method for reducing band scan time by a wireless communication device based on a distribution of powers found by a band scan according to some example embodiments.

FIG. 5 illustrates a flowchart of an example method according to some embodiments. Operation 500 can include the scanning module 218 performing a power scan across a band of radio frequencies. The power scan can provide a power spectrum for the scanned band of radio frequencies. The power scan can be performed using parameters matched to a specific RAT(s). For example, when scanning for an LTE system, the power scan can include a scan of EARFCNs appropriate for the LTE system. Operation 510 can include the scanning module 218 determining a percentage of frequency channels having a power exceeding a threshold power level, TH1. In some embodiments, the scanning module 218 can be configured to generate a cumulative distribution function (CDF) based at least in part on the power scan (e.g., based on a power spectrum or power spectral density function obtained from the power scan). The CDF can be used to determine the percentage of frequency channels exceeding the threshold power level TH1. Operation 520 can include the scanning module 218 determining whether the percentage of frequency channels having a power exceeding the threshold power level TH1 satisfies (e.g., is greater than, or is greater than or equal to depending on embodiment) a percentage threshold level, P1%. In an instance in which the percentage of frequency channels having a power level exceeding the threshold power level TH1 satisfies the percentage threshold level P1%, the method can proceed to operation 530, which can include the wireless communication device 102 attempting acquisition on a first number, X1, of frequency channels. When, however, the percentage of frequency channels having a power level exceeding the threshold power level TH1 does not satisfy the percentage threshold level P1%, the method can proceed to operation 540, which can include the wireless communication device 102 attempting acquisition on a second number, X2, of frequency channels. In some embodiments, the first number X1 of frequency channels searched can be greater than the second number X2 of frequency channels searched. In this regard, when the percentage of frequency channels having a measured power level exceeding a threshold power level satisfies a threshold percentage, then acquisition can be attempted using more frequency channels.

However, when the percentage of frequency channels having a measured power level exceeding a threshold power level does not satisfy the threshold percentage level, acquisition can be attempted on fewer frequency channels to avoid spending an excessive amount of time attempting acquisition for a radio frequency channel band that may be relatively empty.

Figure 6:
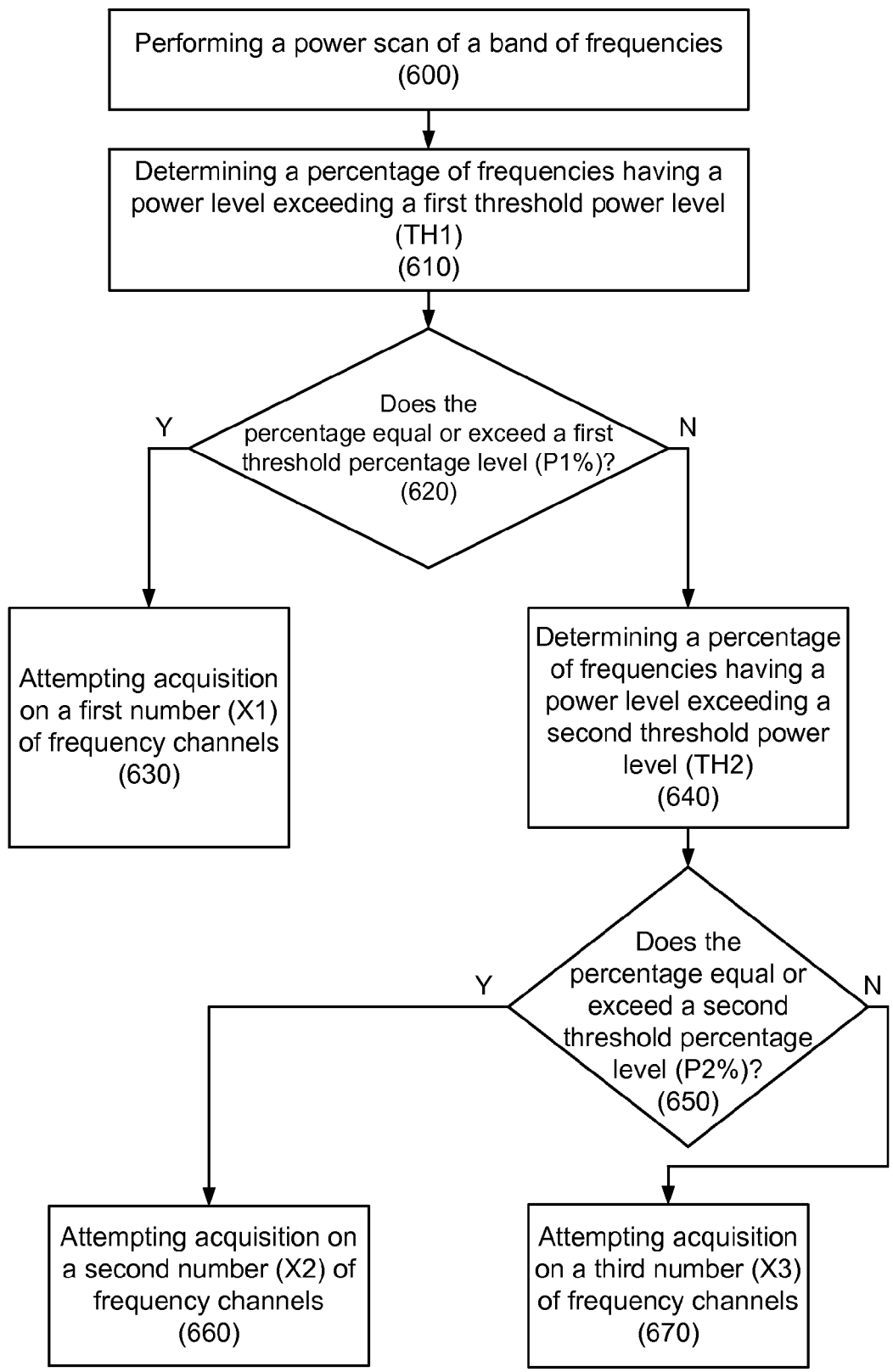
FIG. 6 illustrates a flowchart of another example method for reducing band scan time by a wireless communication device based on a distribution of powers found by a band scan according to some example embodiments.

In some embodiments, a layered approaching using multiple threshold power levels can be used. In this regard, a plurality of threshold power levels can be used to form tiers with a different number of acquisitions being attempted for each tier. More particularly, an iterative series of decreasing threshold power levels can be used to define tiers with comparisons being made between a percentage of frequency channels having a measured power level exceeding a respective threshold power level and a respective threshold percentage level. It will be appreciated that in embodiments using a layered approach, any number of threshold power levels and corresponding tiers can be applied. FIG. 6 illustrates a method in accordance with an example embodiment using two thresholds and three tiers.

As illustrated in FIG. 6, operation 600 can include the scanning module 218 performing a power scan of a band of frequency channels. The power scan can provide a power spectrum for the scanned band of frequency channels. The power scan, in some embodiments, can be tailored for a specific RAT(s). For example, when scanning for an LTE system, the power scan can include a scan of EARFCNs. In some embodiments, power measurements can be performed across frequency channels according to a specific RAT. Operation 610 can include the scanning module 218 determining a percentage of frequency channels having a measured power level exceeding a first threshold power level, TH1. In some embodiments, the scanning module 218 can be configured to generate a cumulative distribution function (CDF) based at least in part on the power scan (e.g., based on a power spectrum or power spectral density obtained from the power scan). The CDF can be used to determine a percentage of frequency channels having a measured power level exceeding the first threshold power level TH1. Operation 620 can include the scanning module 218 determining whether the percentage of frequency channels having a measured power level exceeding the first threshold power level TH1 satisfies (e.g., is greater than, or is greater than or equal to depending on embodiment) a percentage threshold level, P1%. In an instance in which the percentage of frequencies having a measured power level exceeding the first threshold power level TH1 satisfies the percentage threshold level P1%, the method can proceed to operation 630, which can include the wireless communication device 102 attempting acquisition on a first number, X1, of frequency channels.

When, however, the percentage of frequency channels having a measured power level exceeding the first threshold power level TH1 does not satisfy the percentage threshold level P1%, the method can proceed to operation 640, which can include the scanning module 218 determining a percentage of frequency channels having a measured power level exceeding a second threshold power level, TH2. In some embodiments, the second threshold power level TH2 can be less than the first threshold power level TH1. In some example embodiments, a CDF can be used to determine the percentage of frequency channels having a measured power level exceeding the second threshold power level TH2. Operation 650 can include the scanning module 218 determining whether the percentage of frequency channels having a measured power level exceeding the second threshold power level TH2 satisfies (e.g., is greater than, or is greater than or equal to depending on embodiment) a second threshold percentage level, P2%. In some embodiments, the first percentage threshold level P1% and the second threshold percentage level P2% can be chosen as set of respective desired threshold percentage levels, and can have any relationship to each other. For example, the first percentage threshold level P1% can be equal to the second percentage threshold level P2%. Alternatively, the first percentage threshold level P1% can be greater than the second percentage threshold level P2%. Still alternatively, the second percentage threshold level P2% can be greater than the first percentage threshold level P1%. In an instance in which the percentage of frequencies having a measured power level exceeding the second threshold power level TH2 satisfies the percentage threshold level P2%, the method can proceed to operation 660, which can include the wireless communication device 102 attempting acquisition on a second number, X2, of frequency channels. In some embodiments, the second number X2 of frequency channels on which an acquisition can be attempted can be less than the first number X1 of frequency channels. When, however, the percentage of frequency channels having a measured power level exceeding the threshold power level TH2 does not satisfy the percentage threshold level P2%, the method can proceed to operation 670, which can include the wireless communication device 102 attempting acquisition on a third number, X3, of frequency channels. In some embodiments, the number X3 of frequency channels searched can be less than the number X2 of frequency channels searched.

In embodiments implementing a further threshold power level and additional tiers, a comparison between the percentage of frequency channels exceeding a third threshold power level, TH3, being less than the second threshold power level TH2 and a third threshold percentage level, P3%, could be made in place of operation 670. As such, it will be appreciated that threshold comparison operations can be iterated with smaller threshold power levels and decreasing limiting numbers of frequency channels on which to attempt acquisition in some example embodiments.

In the described example embodiments, the number of frequency channels on which to attempt acquisition (e.g., X1, X2, X3, etc.) in various tiers can be selected based on a band(s) of radio frequencies being scanned. For example, acquisition can be attempted on a larger number of frequency channels for larger bands (i.e., bands that occupy more frequency bandwidth total or contain more candidate frequency channels) than for smaller bands. Additionally or alternatively, the number of frequency channels on which to attempt acquisition (e.g., X1, X2, X3, etc.) in various tiers can be determined based on previous power scan results and/or based on the type of scan (e.g., out of service (OOS) scan, power up scan, and/or other type of scan) being attempted. For example, the number of frequency channels for which acquisition can be attempted can be changed in instances in which no system has been found in a previous scan(s), such as, the previous n scans, with n being a configurable integer number. In some embodiments, a history of previous scan results can be used to inform a current scan, e.g., to search for a previously determined set of frequency channels, or to avoid searching in one or more ranges of radio frequencies in which previous scans have been unsuccessful, particularly repeatedly. As another example, the number of frequency channels for which acquisition can be attempted can be changed in the instance of a power up scan, which can be in some embodiments more extensive than when returning from an OOS condition. In some embodiments, a length of time for an OOS condition can be used to determine whether to perform a power scan (or how extensive a scan to perform). For example, a brief OOS condition can require a shorter scan than an extended OOS time period.

In some examples, the threshold power levels (e.g., TH1, TH2, etc.) that can be used to define various tiers can be adaptively determined based at least in part on one or more previous power scan results and/or based on the type of scan (e.g., an OOS scan, a power up scan, and/or other type of scan) being performed. For example, a threshold power level can be relaxed in instances in which no system has been found in a previous scan(s), such as, the previous n scans, with n being a configurable integer number, in order to determine available frequency channels that can operate at lower power levels. As another example, a threshold power level can be relaxed in the instance of a power up scan in order to perform a more extensive search for frequencies on which to attempt an acquisition. In some embodiments, the percentage threshold levels (e.g., P1%, P2%, etc.) can be adaptively determined based at least in part on previous power scan information and/or based on a type of scan being performed. For example, when previous scan information for a particular range of frequencies (or a particular frequency channel band, or a particular RAT associated with a range/band) indicates lower likelihood of locating suitable cells (e.g., few or no frequency channels found, repeated acquisition failures, low percentage of frequency channels), settings for the percentage threshold levels and/or the power threshold levels can be changed to reduce time spent searching frequency bands with a low likelihood of success. Similarly, in some embodiments, the percentage threshold levels and/or the threshold power levels can be adapted based on previous measurements and/or success rates to increase time searching frequency channel bands with a higher likelihood of success. In some embodiments, threshold power levels can be increased to higher values when multiple acquisition attempts on frequency channels located in a radio frequency channel band fail, thereby requiring stronger frequency channels for a particular radio frequency channel band.

In some embodiments, the wireless communication device obtains threshold power levels and/or threshold percentage levels from a storage medium included in or associated with the wireless communication device. In some embodiments, the stored threshold power levels and/or the stored threshold percentage levels are based at least in part on measured power levels or acquisition success rates for one or more previous band scans. In some embodiments, the wireless communication device adapts and stores updated values for the threshold power levels and/or the threshold percentage levels in the storage medium based at least in part on measured power levels or acquisition success rates achieved for a present band scan.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium for controlling a wireless communication device or a wireless network entity. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. A computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method to reduce band scan time by a wireless communication device, the method comprising:
at the wireless communication device:
performing a power scan of a band of radio frequencies;
determining a percentage of frequency channels having power levels equal or exceeding a first threshold power level using a cumulative distribution function generated based at least in part on the power scan;
comparing the determined percentage of frequency channels to a first threshold percentage level;
in an instance in which the determined percentage of frequency channels equals or exceeds the first threshold percentage level, attempting acquisition on a first number of frequency channels; and
in an instance in which the determined percentage of frequency channels does not equal or exceed the first threshold percentage level, attempting acquisition on a second number of frequency channels, wherein the first number of frequency channels is greater than the second number of frequency channels.

2. The method as recited in claim 1, further comprising, in an instance in which the determined percentage of frequency channels does not equal or exceed the first threshold percentage level:
determining a second percentage of frequency channels that exceed a second threshold power level, wherein the second threshold power level is less than the first threshold power level;
comparing the second percentage of frequency channels that exceed the second threshold power level to a second threshold percentage level; and
wherein the second number of frequency channels equals:
a third number of frequency channels, in an instance in which the determined second percentage of frequency channels equals or exceeds the second threshold percentage level, or
a fourth number of frequency channels, in an instance in which the determined second percentage of frequency channels does not equal or exceed the second threshold percentage level,
wherein the third number of frequency channels is greater than the fourth number of frequency channels.

3. The method as recited in claim 1, wherein performing the power scan comprises measuring a power level over a plurality of candidate frequency channels.

4. The method as recited in claim 1, wherein the first number of frequency channels and the second number of frequency channels are based at least in part on whether the power scan is performed by the wireless communication device upon power up, when returning from an out of service condition, or as part of a cell reselection or handover procedure.

5. The method as recited in claim 1, wherein the band of radio frequencies is associated with a long term evolution (LTE) wireless communication protocol.

6. The method as recited in claim 1, wherein the power level corresponds to one of a reference signal received power (RSRP), a received signal code power (RSCP), a received signal strength indicator (RSSI), or another power metric for a radio access technology associated with the band of radio frequencies.

7. A wireless communication device comprising:
processing circuitry comprising a processor and a memory coupled thereto;
at least one transceiver coupled to the processing circuitry; and
a scanning module coupled to the processing circuitry;
wherein the processing circuitry in conjunction with the scanning module is configured to:
perform a power scan of a band of radio frequencies;
determine a percentage of frequency channels having power levels equal or exceeding a first threshold power level using a cumulative distribution function generated based at least in part on the power scan;
compare the determined percentage of frequency channels to a first threshold percentage level;
in an instance in which the determined percentage of frequency channels equals or exceeds the first threshold percentage level, attempt acquisition on a first number of frequency channels; and
in an instance in which the determined percentage of frequency channels does not equal or exceed the first threshold percentage level, attempt acquisition on a second number of frequency channels, wherein the first number of frequency channels is greater than the second number of frequency channels.

8. The wireless communication device as recited in claim 7, wherein the processing circuitry performs the power scan by measuring a power level over a plurality of candidate frequency channels.

9. The wireless communication device as recited in claim 8, wherein power levels obtained by the power scan correspond to one of a reference signal received power (RSRP), a received signal code power (RSCP), a received signal strength indicator (RSSI), or another power metric for a radio access technology associated with the band of radio frequencies.

10. The wireless communication device as recited in claim 7, wherein the processing circuitry in conjunction with the scanning module is further configured to:
obtain the first number of frequency channels or the second number of frequency channels from the memory, wherein the first number of frequency channels and the second number of frequency channels are based at least in part on whether the power scan is performed by the wireless communication device upon power up, when returning from an out of service condition, or as part of a cell reselection or handover procedure.

11. The wireless communication device as recited in claim 7, wherein the processing circuitry in conjunction with the scanning module is further configured to:
determine a second percentage of frequency channels that exceed a second threshold power level, wherein the second threshold power level is less than the first threshold power level;
compare the second percentage of frequency channels that exceed the second threshold power level to a second threshold percentage level; and wherein the second number of frequency channels equals:
a third number of frequency channels, in an instance in which the determined second percentage of frequency channels equals or exceeds the second threshold percentage level, or
a fourth number of frequency channels, in an instance in which the determined percentage of frequency channels does not equal or exceed the second threshold percentage level,
wherein the third number of frequency channels is greater than the fourth number of frequency channels.

12. The wireless communication device as recited in claim 7, wherein the first number of frequency channels and the second number of frequency channels are based at least in part on whether the power scan is performed by the wireless communication device upon power up, when returning from an out of service condition, or as part of a cell reselection or handover procedure.

13. The wireless communication device as recited in claim 7, wherein the band of radio frequencies is associated with a long term evolution (LTE) wireless communication protocol.

14. A non-transitory computer-readable medium storing instructions that, when executed by one or more processors of a wireless communication device, cause the wireless communication device to:
perform a power scan of a band of radio frequencies;
determine a percentage of frequency channels having power levels equal or exceeding a first threshold power level;
compare the determined percentage of frequency channels to a first threshold percentage level;
in an instance in which the determined percentage of frequency channels equals or exceeds the first threshold percentage level, attempt acquisition on a first number of frequency channels; and
in an instance in which the determined percentage of frequency channels does not equal or exceed the first threshold percentage level:
determine a second percentage of frequency channels that exceed a second threshold power level, wherein the second threshold power level is less than the first threshold power level;
compare the percentage of frequency channels that exceed the second threshold power level to a second threshold percentage level;
attempt acquisition on a second number of frequency channels, in an instance in which the determined second percentage of frequency channels equals or exceeds the second threshold percentage level; and
attempt acquisition on a third number of frequency channels, in an instance in which the determined second percentage of frequency channels does not equal or exceed the second threshold percentage level,
wherein the first number of frequency channels is greater than the second number of frequency channels, and the second number of frequency channel is greater than the third number of frequency channels.

15. The non-transitory computer-readable medium as recited in claim 14, wherein the wireless communication device performs the power scan by at least measuring a power level over a plurality of candidate frequency channels.

16. The non-transitory computer-readable medium as recited in claim 14, wherein the first number of frequency channels and the second number of frequency channels are based at least in part on whether the power scan is performed by the wireless communication device upon power up, when returning from an out of service condition, or as part of a cell reselection or handover procedure.

17. The non-transitory computer-readable medium as recited in claim 14, wherein the power level corresponds to one of a reference signal received power (RSRP), a received signal code power (RSCP), a received signal strength indicator (RSSI), or another power metric for a radio access technology associated with the band of radio frequencies.

18. The non-transitory computer-readable medium as recited in claim 14, wherein the band of radio frequencies is associated with a long term evolution (LTE) wireless communication protocol.

* * * * *